April 12, 1949.  F. HONERKAMP ET AL  2,466,851
AIR FLOW CONTROL MEANS

Filed Aug. 16, 1943  3 Sheets-Sheet 1

Inventor
F. Honerkamp,
F. J. Kurth,
By Carroll Bailey
Attorney

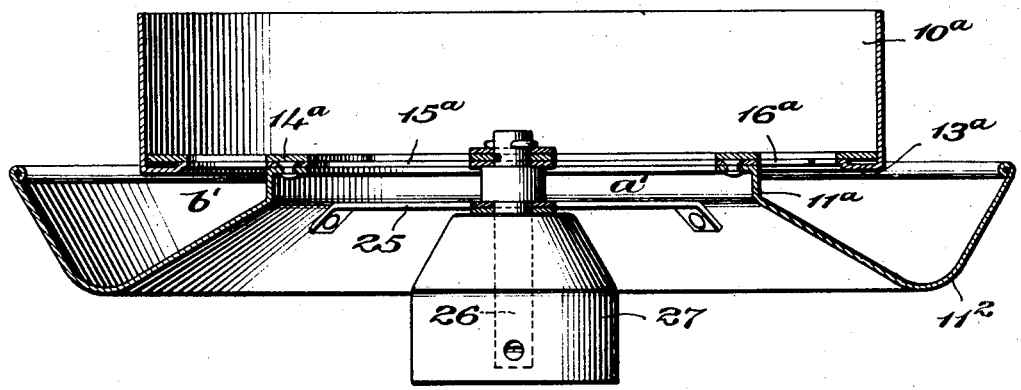
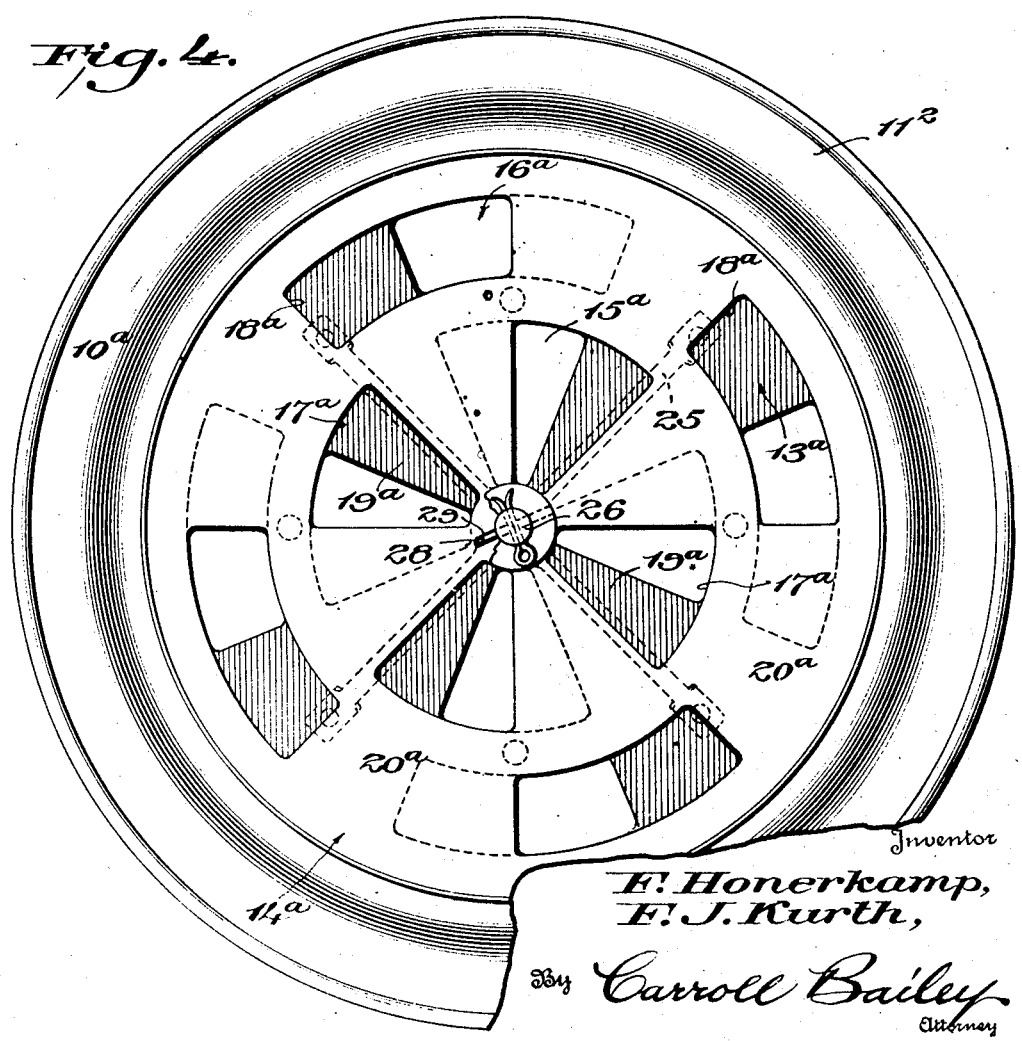

April 12, 1949.  F. HONERKAMP ET AL  2,466,851
AIR FLOW CONTROL MEANS
Filed Aug. 16, 1943  3 Sheets-Sheet 3
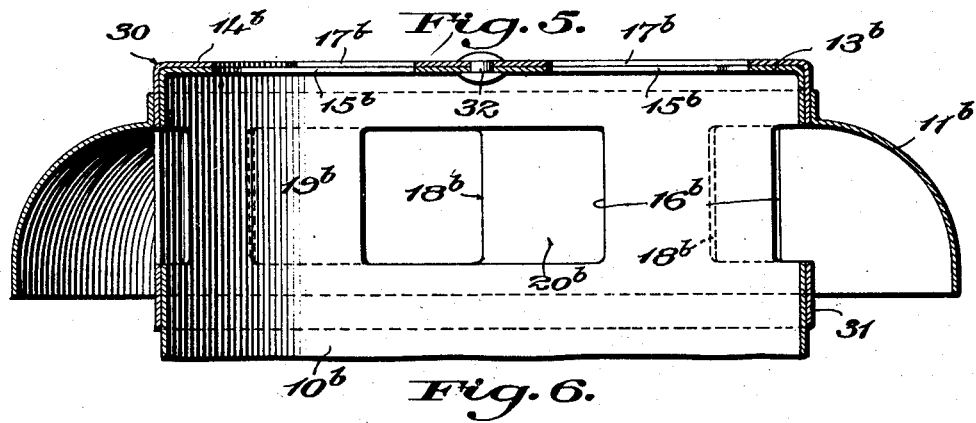
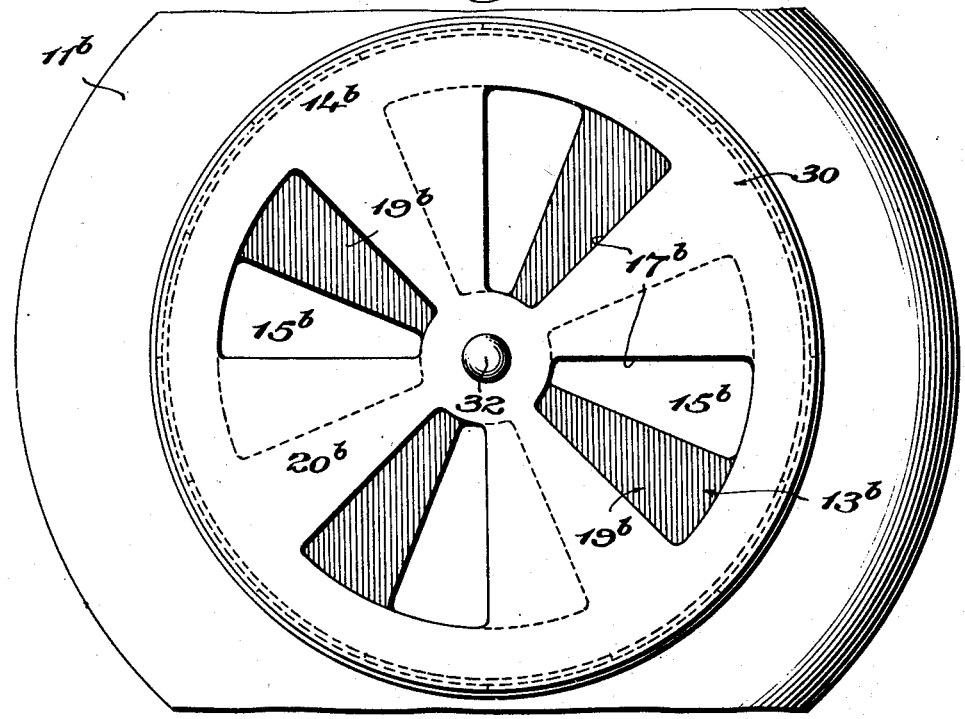
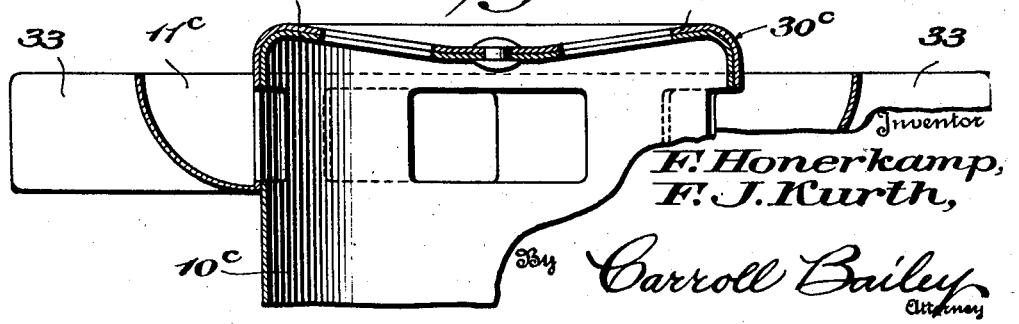

Patented Apr. 12, 1949

2,466,851

UNITED STATES PATENT OFFICE 2,466,851

AIR FLOW CONTROL MEANS

Friedrich Honerkamp and Franz J. Kurth, New York, N. Y., assignors to Anemostat Corporation of America, New York, N. Y., a corporation of Delaware Application August 16, 1943, Serial No. 498,842

9 Claims. (Cl. 98—40)

This invention relates to air flow control means, and has particular reference to means for regulating the volume and controlling the direction or manner of flow of air delivered from air supply conduits, casings or the like, for heating, cooling or other purposes.

In most instances where air is delivered from a conduit for heating, cooling or other purposes, it is desirable to regulate the volume of the air delivered. Moreover, in many instances it may be desired at certain times to have the air delivered in one direction or in a given manner while at other times it may be desired to have it delivered in another direction or in a different manner. For example, in the aircraft art where warm air is supplied for the comfort of the pilot, it may be desired to have the air delivered normally in some given direction relative to the pilot other than toward any given part of his person and at other times it may be desired to have the air delivered toward some given part of his person, toward his feet, for example. Again, it may be desired at certain times to have the air delivered in concentrated or jet form and at other times in dispersed or diffused form. At the same time, it is preferred to have the directional control means bodily fixed rather than mounted for bodily or dirigible adjustment, as thereby certain complications and disadvantages may be avoided.

Accordingly, the general object of the invention is to provide an air flow control means which may be fixed bodily and which comprises a simple, practical combination and arrangement of parts whereby the volume of the delivered air may readily be regulated and the delivered air may be caused to be delivered in its entirety in either of two different directions or manners, or in part in each of said directions or manners, by ready and easy manipulation of a very simple form of valve element.

With the foregoing and other objects in view, which will become more fully apparent as the nature of the invention is better understood, the same consists in an air flow control means embodying the novel features of construction, combination and arrangement of parts as will be hereinafter more fully described, illustrated in the accompanying drawings and defined in the appended claims.

In the accompanying drawings, wherein like characters of reference denote corresponding parts in the different views:

Figure 3 is a view similar to Fig. 1 illustrating an alternative embodiment of the invention;

Figure 4 is an end view of the construction shown in Fig. 3;

Figure 5 is a view similar to Figs. 1 and 3 illustrating another alternative embodiment of the invention;

Figure 6 is an end view of the construction shown in Fig. 5; and

Figure 7 is a view similar to Figs. 1, 3 and 5 illustrating another alternative embodiment of the invention.

Figure 1:
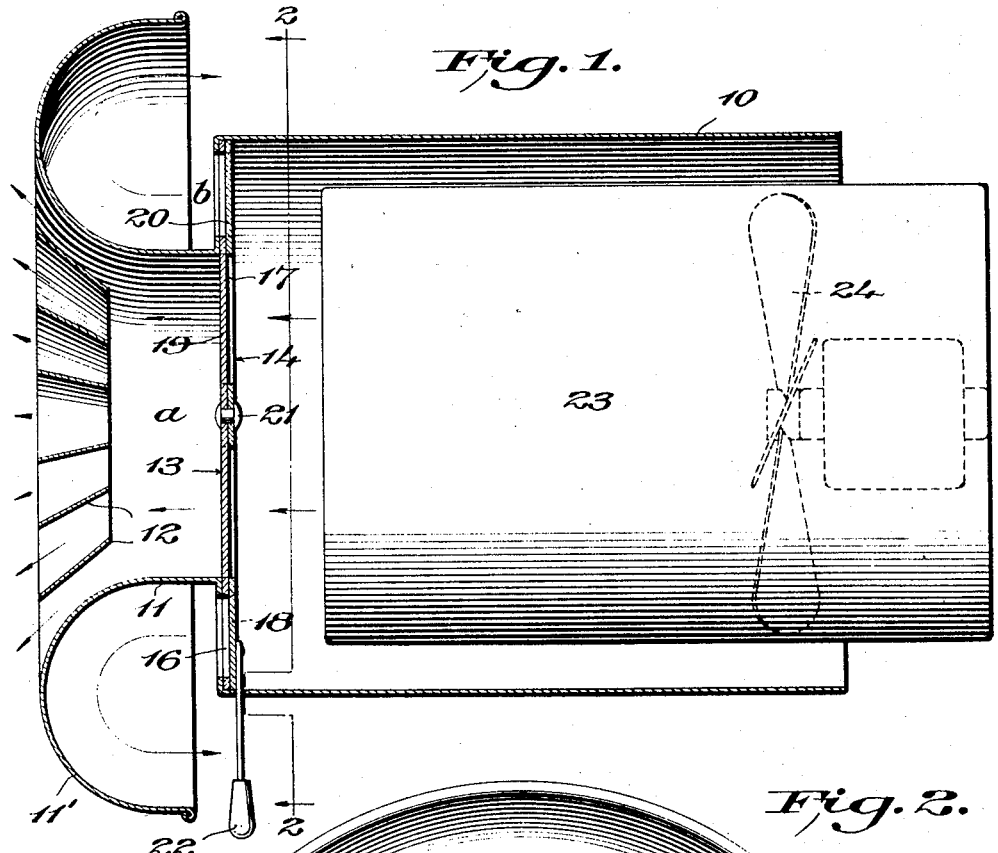
Figure 1 is a central, longitudinal section through an air flow control means constructed in accordance with one practical embodiment of the invention.
Figure 2:
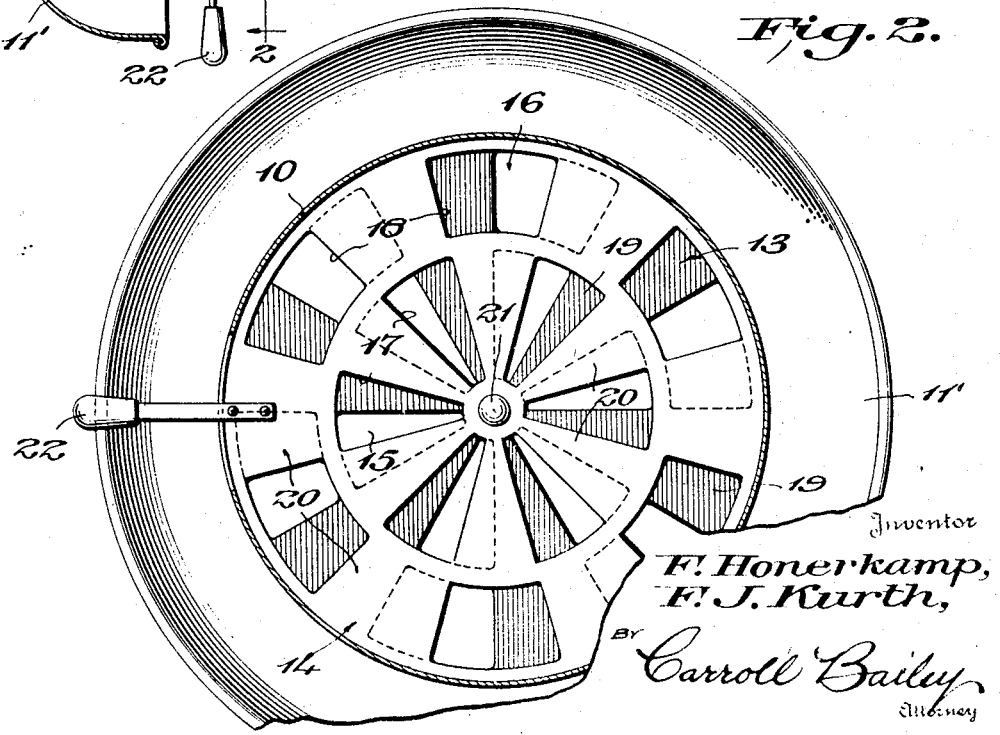
Figure 2 is a cross section on the line 2—2 of Fig. 1.

Referring to the drawings in detail, first with particular reference to the embodiment of the invention shown in Figs. 1 and 2, 10 designates a supply conduit or casing for air for heating, cooling or other purposes, and 11 designates a tubular member alined with said conduit or casing 10 at the open, outlet end thereof and cooperating therewith to provide two separate passageways for outlet of air therefrom, one of these passageways, designated as $a$, being interiorly of said tubular member 11 and the other, designated as $b$, being exteriorly thereof between the same and the conduit or casing 10.

Preferably the conduit 10 and the tubular member 11 are of circular shape in cross section and are axially alined with each other so that the passageway $b$ is concentric with respect to the passageway $a$. Said conduit and said tubular member may, however, be of any other desired shape in cross section and may be axially disalined if preferred. Moreover, said conduit and said tubular member may be of any desired sizes and may have any desired cross sectional areas relative to each other. Preferably, however, they are of such cross sectional areas that the passageways $a$ and $b$ have approximately equal cross sectional areas.

The tubular member 11 may be of any desired length and is open at its ends for flow of air therethrough from the conduit 10. Moreover, the inner end of said tubular member 11 may be disposed either in the plane of the outlet end of the conduit 10 or any suitable distance either inwardly or outwardly of said plane. In any event, the outer end portion of said tubular member 11 is suitably formed to provide, or is suitably provided with, or has operatively associated therewith, a deflector 11' to cause air flowing from the conduit 10 through the passageway b to be discharged from the device in a direction different from the air discharged through the passageway a. The shape of the deflector and its relationship to the tubular member 11 for this purpose is arbitrary, depending upon the direction of flow it is desired to impart to air discharged from the passageway b. For example, the outer end portion of the tubular member 11 may be curved outwardly and rearwardly as shown to provide said deflector and, at the same time, the latter is formed to direct air from the passageway b in a direction substantially opposite to the direction of flow of air from the passageway a. Alternatively, the deflector 11' may be of any other desired shape to direct air from the passageway b in any other desired direction. Moreover, said deflector 11' may be either an integral part of the tubular member 11 or a part separate therefrom and attached thereto or operatively associated therewith in any desired manner. Furthermore, the passageway a may be unobstructed for unimpeded flow of air therethrough and therefrom or may have any desired air diffusing means associated therewith. In this connection and as illustrated in the drawings, it is preferred to provide in the outer end portion of the passageway a at least one open-ended, hollow, flaring member 12 and preferably a series of successively smaller such members having successively lesser amounts of flare so that air discharged from said passageway a is divided into a plurality of separate streams and is caused to be delivered in diffused form. Any other means for the same or a similar purpose may, of course, be provided if desired. Also, if desired, means for the same or a similar purpose may be provided at the outlet end of the passageway b.

In accordance with the invention, valve means is provided for regulating flow of air from the conduit 10 through the passageways a and b, and this valve means, which may be of any suitable design, preferably is operable to direct all of the air through either of said passageways to the exclusion of the other, or any desired portion of the air through either of said passageways and the remainder through the other of said passageways.

As illustrated in the present instance the mentioned valve means comprises a pair of apertured disks 13 and 14 disposed transversely across the passageways a and b and one of which is fixed while the other is rotatable relative thereto to aline and disaline their apertures and thus effect the said air-flow regulation.

The fixed disk 13 is provided with an inner annular row of apertures 15 which are alined with the passageway a, and with an outer annular row of apertures 16 which are alined with the passageway b, while the rotatable disk 14 likewise is provided with an inner annular row of apertures 17 and with an outer annular row of apertures 18 which rows also are alined with the passageways a and b, respectively.

Between the apertures of each row in the disk 13 are solid or closed portions 19 of approximately the same size and shape as the apertures in said rows respectively, while between the apertures of each row in the disk 14 are solid or closed portions 20 which likewise are of approximately the same size and shape as the apertures in said rows, respectively. Moreover, corresponding rows of apertures and the intervening solid or closed portions of the respective disks are of approximately equal size and shape and are disposed approximately equal distances from the centers of the respective disks so that by rotation of the rotatable disk 14 relative to the fixed disk 13 the apertures of corresponding rows in the two disks may be alined and disalined. Furthermore, the apertures of the respective rows in one disk, the disk 14 for example, are disalined radially, while the apertures of the respective rows in the other disk, the disk 13 for example, are alined radially. Manifestly, therefore, when the rotatable disk 14 is rotated to a position to fully register the apertures in either row thereof with the apertures in the corresponding row of the fixed disk 13, the apertures in the other corresponding rows of said disks are closed by the solid or closed portions 19 and 20, respectively, between the apertures in said other rows. Manifestly, too, the rotatable disk may be rotated to more or less register the apertures of each row of apertures therein with the apertures of the related rows in the fixed disk. Accordingly, it is apparent that by mere rotation of the rotatable disk 14, all of the air discharged from the conduit 10 may be caused to flow therefrom through the passageway a to the exclusion of the passageway b, or through the passageway b to the exclusion of the passageway a, or that any desired portion of the air may be caused to be delivered through either of said passageways and the remainder through the other of said passageways. In this connection and within the purview of the invention, the rotatable disk 14 may be mounted for rotation in any desired manner and any suitable means may be provided for effecting or facilitating its rotation, the same being shown in the present instance as being centrally pivoted to the fixed disk, as indicated at 21, and as having a handle element 22 projecting therefrom for effecting its rotation. The two disks preferably are disposed in face to face relationship and the frictional engagement between them may be depended upon to hold the fixed disk in any rotatably adjusted position thereof. However, said disks are not necessarily frictionally engaged with each other and any means other than their frictional engagement with each other may be provided to hold the rotatable disk in rotatably adjusted positions.

The conduit or casing 10 may lead from any suitable near or remote source of supply of fresh or treated, heated or cooled air or it may house an air heating or cooling unit designated generally as 23.

The unit 23, if same is provided, may be of any suitable construction and, if desired, may include a motor driven fan 24 or any other suitable means for effecting flow of the air through the unit at a desired velocity.

In view of the foregoing it will be apparent that by rotating the disk 14 to fully register its row of apertures 17 with the corresponding row of apertures 15 in the disk 13, the apertures 18 and 16 of said disks will be completely disalined and all of the air will be delivered through the passageway a and will be discharged therefrom either in jet or blast form if members such as the members 12 are not provided, and in diffused form if members such as the members 12 or their equivalents are provided. On the other hand, it will be equally apparent that by rotating the disk 14 to fully register its row of apertures 18 with the corresponding row of apertures 16 in the disk 13, the apertures 17 and 15 of said disks will be completely disalined and all of the air will be delivered through the passageway $b$ for discharge from the device in a direction as determined by the shape of the deflector 11'. Alternatively, the disk 14 may be rotated to any intermediate position to partly aline the apertures of both of its rows with the apertures of both rows in the disk 13 to cause any desired proportion of the total amount of the supplied air to be delivered through either of the passageways $a$ or $b$ and the remainder through the other of said passageways. In any event, air delivered through the passageways $a$ and $b$ will be delivered from the device in different directions, respectively.

The device may be used wherever it may be desired to have air delivered therefrom in one direction at any given time and in another direction any any other time, or partly in each of two different directions at the same time. For example, the device may be used to supply warm or cool air for the comfort of an aircraft pilot and may be mounted so as to be readily controlled by the pilot to deliver air in different desired directions relative to his person. Moreover, the device considered as an entirety may be mounted in a fixed position as distinguished from being undesirably mounted for movement as a complete unit to accomplish its purpose.

Referring now to Figs. 3 and 4 of the drawings, it will be observed that the device therein illustrated is of the same general construction and mode of operation as the Figs. 1 and 2 device, but differs from the latter device primarily in that the handle for adjusting the rotatable valve disk is in the form of a knob located at the front of the device and axially with respect thereto.

According to the Figs. 3 and 4 construction, the device comprises a conduit or casing $10^a$ and a tubular member $11^a$ corresponding to the conduit 10 and the tubular member 11, respectively, of the Figs. 1 and 2 construction, the conduit $10^a$ being inturned at its end to provide a fixed wall or disk $13^a$ corresponding to the fixed wall or disk 13 of the Figs. 1 and 2 construction, and the tubular member $11^a$ being fastened to said fixed wall or disk $13^a$ intermediate inner and outer annular rows of apertures $15^a$ and $16^a$ therein corresponding to the inner and outer rows of apertures 15, 16, respectively, of the Figs. 1 and 2 construction. Thus, as in the case of the Figs. 1 and 2 construction, two separate passageways for outlet of air from the conduit or casing $10^a$ are provided, one of these passageways, designated as $a'$, being interiorly of the tubular member $11^a$ and the other, designated as $b'$, being exteriorly thereof between the same and said conduit or casing $10^a$.

The tubular member $11^a$ is directed outwardly and rearwardly to provide a deflector $11^2$ corresponding to the deflector 11' to direct air flowing from the device through the passageway $b'$ rearwardly relative to the device, and, as in the case of the Figs. 1 and 2 construction, the passageway $a'$ may or may not be provided with members such as the members 12 for effecting diffusion of air flowing forwardly from the device through said passageway $a'$.

A spider 25 is suitably fastened to the conduit or neck $11^a$ and is disposed in the passageway $a'$ and has journaled therein a shaft 26 which is disposed coaxially with respect to the device, this shaft, at its outer end, having suitably fixed thereto a handle in the form of a knob 27 for effecting its rotation and, at its inner end, carrying a valve disk $14^a$ which is disposed against the fixed wall or disk $13^a$ and which corresponds to the valve disk 14 of the Figs. 1 and 2 construction.

In the valve disk $14^a$ are inner and outer annular rows of apertures $17^a$ and $18^a$ to be alined with and disalined from the inner and outer rows of apertures $15^a$ and $16^a$, respectively, of the fixed wall or disk $13^a$ by rotation of said valve disk $14^a$ and in accordance with the invention said valve disk is suitably keyed to the shaft 26 as, for example, by means of a pin 28 extending through said shaft and disposed in a slot 29 in said valve disk, whereby the latter is rotatable with said shaft.

As in the case of the Figs. 1 and 2 construction, the apertures of the respective rows in one of the disks, the disk $14^a$ for example, are disalined radially, while the apertures of the respective rows in the other of said disks, the disk $13^a$ for example, are alined radially. Moreover, between the apertures of each row in the disk $13^a$ are solid or closed portions $19^a$ of approximately the same size and shape as the apertures in said rows, respectively, while between the apertures of each row in the disk $14^a$ are solid or closed portions $20^a$ which likewise are of approximately the same size and shape as the apertures in said rows, respectively. Accordingly, by rotating the valve disk $14^a$ the same general results are attained as by rotating the valve disk 14 of the Figs. 1 and 2 construction, the knob 27 located at the front of the device, centrally thereof, affording a convenient means for readily and easily rotating said valve disk $14^a$.

The conduit $10^a$ may be in the form of a short neck as shown for attachment to any main or branch air supply conduit, or it may be a main or branch conduit of an air supply system. In either case, it may contain a suitable air heating or cooling unit or the means for heating or cooling and forcing the air therethrough may be located at a point remote from the outlet device.

Referring now to Figs. 5 and 6 of the drawings, it will be observed that the device therein illustrated is of a somewhat different construction from the devices illustrated in Figs. 1 to 4 for accomplishing the same general purposes as the latter constructions.

According to the Figs. 5 and 6 construction, an air supply conduit or casing $10^b$ has extending across its discharge end a wall or disk $13^b$ having therein a single, annular row of apertures $15^b$, while in the side wall of said conduit or casing is another single, annular row of apertures $16^b$.

A cap member 30 is engaged over the discharge end of the conduit $10^b$ and includes an end wall $14^b$, constituting a valve disk overlying the wall or disk $13^b$, and a cylindrical side wall 31 constituting a valve element embracing the side wall of said conduit.

In the end wall $14^b$ and the side wall 31 of the cap member 30 are annular rows of apertures $17^b$ and $18^b$, respectively, for alinement with and disalinement from the apertures $15^b$ and $16^b$, respectively, by rotation of said cap member 30, while affixed to said cap member, exteriorly thereof and forwardly of the apertures $18^b$, is a deflector element $11^b$ for directing air issuing from the apertures $18^b$ rearwardly relative to the device.

The cap member 30 is rotatably mounted on the conduit $10^b$ as, for example, by means of a pivot pin 32 connecting the walls $13^b$ and $14^b$ centrally thereof, while between the apertures $15^b$ and $16^b$ are solid or closed portions $19^b$ of approximately the same size and shape as said apertures, and between the apertures 17$^b$ and 18$^b$ are other solid or closed portions 20$^b$ of approximately the same size and shape as these latter apertures. Moreover, either the apertures 15$^b$, 16$^b$ are alined radially and the apertures 17$^b$, 18$^b$ are disalined radially, or the latter apertures are alined radially and the apertures 15$^b$, 16$^b$ are disalined radially. In either case, rotation of the cap member 30 to aline the apertures 15$^b$, 17$^b$ will disaline the apertures 16$^b$, 18$^b$ and vice versa. Accordingly, by rotatably adjusting the cap member 30, all of the air may be directed forwardly from the device through the apertures 15$^b$, 17$^b$, or all of the air may be directed through the apertures 16$^b$, 18$^b$ laterally in the absence of the deflector element 11$^b$ or may be deflected rearwardly by said deflector element 11$^b$ if same is provided, or some of the air may be directed forwardly and the remainder laterally or rearwardly, depending upon whether the deflector element 11$^b$ is or is not used.

The conduit 10$^b$ may, of course, be connected with any desired source of heated or cooled air or it may contain a unit of any suitable type for heating or cooling the supplied air. Moreover, any suitable handle means may be provided, if desired, to facilitate rotation of the cap member 30.

Referring now to Fig. 7 of the drawings, it will be observed that the construction therein illustrated is the same as the Figs. 5 and 6 construction, except that the deflector element, designated as 11$^c$, is disposed to deflect the air forwardly and laterally outward, and the disk portions 13$^c$ and 14$^c$ of the conduit 10$^c$ and the cap 30$^c$, respectively, are dished to cause the air discharged through the apertures therein to issue from the end of the device in concentrated or blast form. Fig. 7 also illustrates that the cap member 30$^c$ may be provided with hand or foot engageable pieces 33 for effecting rotation of said cap member.

From the foregoing description considered in connection with the accompanying drawings it is believed that the features and the advantages of the invention will be clearly understood and appreciated. It is desired to point out, however, that while only a single, specific embodiment of the invention has been illustrated and described, the same is readily capable of embodiment in specifically different structures within its spirit and scope, as defined in the appended claims.

What is claimed is:

1. Air flow control means comprising an air supply conduit, wall means having two separate annular rows of spaced apart openings for outlet of air from said conduit, means to cause air delivered through the openings of the two sets to be discharged from the conduit in different directions, respectively, and a single rotatable valve disk operatively associated with said wall means and having therein two separate annular spaced apart rows of openings related to said rows in said wall means and operable by rotation thereof to completely or partly aline the openings of either row thereof with the openings of the corresponding row in said wall means and simultaneously to completely or partly disaline the openings of the other row thereof from the openings of the other row in said wall means.

2. In combination with an air supply conduit, means providing separate inner and outer concentric passageways for delivery of air from said conduit, means for causing the air delivered through one of said passageways to flow in a different direction from the air delivered through the other of said passageways, and a pair of apertured disks disposed in said passageways for controlling delivery of air therethrough, said disks each having an inner annular row of apertures and closed portions therebetween alined with the inner passageway and an outer annular row of apertures and closed portions therebetween alined with the outer passageway, and means mounting one of said disks for rotation relative to the other to aline and disaline their respective apertures to regulate the amount of air delivered through each passageway, the apertures of the respective rows of at least one of said disks being at least partly disalined radially so that said rotatable disk is effective by rotation thereof to open one and simultaneously to close the other of said passageways.

3. In combination with an air supply conduit, an open-ended tubular member alined with said conduit for delivery of air therethrough from said conduit and providing between the same and said conduit a passageway also for delivery of air therethrough from said conduit, the outer end portion of said tubular member being directed outwardly and rearwardly to provide an annular air deflector to cause the air delivered through said passageway to flow in a direction substantially opposite the direction of flow of the air delivered through said tubular member, and valve means separate from said tubular member and said deflector for regulating delivery of air from said conduit through said tubular member and said passageway, said valve means comprising a pair of apertured members one of which is rotatable relative to the other and the apertures of which are angularly related so that by rotation of said rotatable member to decrease flow of air from said conduit through said tubular member flow of air from said conduit through said passageway is increased and vice-versa.

4. In combination with conduit means defining two separate concentric air passageways, fixed wall means extending transversely across each of said passageways and having therein two annular rows of spaced apart openings with solid wall portions therebetween, said two rows of openings being alined with said passageways, respectively to permit flow of air therethrough, and a second wall means having therein two annular rows of spaced apart openings with solid portions therebetween and mounted for rotation relative to said first mentioned wall means to aline and disaline its respective rows of openings with and from the corresponding rows of openings of said first mentioned wall means to vary the effective areas of said openings and thereby regulate flow of air through said passageways, the openings of the respective rows of one of said wall means being disalined radially and the openings of the respective rows of the other of said wall means being alined radially so that when said second mentioned wall means is rotated to aline the openings of either of its rows with the openings of the corresponding row in said first mentioned wall means the openings of its other row are disalined from the openings in the corresponding row of said first mentioned wall means.

5. In combination with means defining an inner passageway and an outer surrounding passageway for air, valve means for regulating flow of air through said passageways, said valve means being located in said passageways and comprising a fixed apertured disk and another apertured disk rotatable relative thereto, the apertures in said disks being arranged so that by rotation of said rotatable disk the apertures thereof may be alined and disalined with and from the apertures of said fixed disk to close either of said passageways and to simultaneously open the other or to partly close either and partly open the other.

6. Valve means for controlling flow of fluid through an inner passageway and a separate outer concentric passageway, said valve means comprising a rotatable disk element and a flat wall element each to extend transversely across both passageways, said elements being superimposed one upon the other and each having therein an inner circular row of openings and closed portions therebetween for alinement with the inner passageway and an outer circular row of openings and closed portions therebetween for alinement with the outer passageway, the openings and the closed portions therebetween of the respective rows of said elements being angularly related to each other and of angular lengths such that rotation of said disk element to completely aline the openings in either row thereof with the openings of the corresponding row of said wall element effects complete disalinement of the openings of the other row thereof from the openings of the other row of said wall element.

7. Valve means as set forth in claim 6 in which the openings of the respective rows of one of the elements are radially alined and the openings of the respective rows of the other element are radially disalined, and in which the closed portions between the openings of both elements are at least as long angularly as the openings.

8. Valve means as set forth in claim 6 in which the openings of the respective rows of the two elements are angularly related to each other so that the openings of both rows of said elements may be simultaneously partly alined.

9. Air flow control means comprising an air supply conduit, a wall element extending transversely across said conduit and having therein two separate concentric rows of spaced apart openings for outlet of air from said conduit, and a single rotatable valve element disposed adjacent to said wall element and having therein two annular rows of spaced apart openings related to said rows in said wall element, respectively, the openings of the respective rows in said wall and valve elements having an angular relationship to each other such that said valve element is operable by rotation thereof to completely or partly aline the openings of either row thereof with the openings of the corresponding row in said wall element and simultaneously to completely or partly disaline the openings of the other row thereof from the openings in the other row of said wall element, said angular relationship including at least partial radial disalinement of the openings of the respective rows in at least one of said wall and valve elements.

FRIEDRICH HONERKAMP.
FRANZ J. KURTH.

REFERENCES CITED

The following references are of record in the file of this patent:

UNITED STATES PATENTS

| Number | Name | Date |
| --- | --- | --- |
| 38,370 | Boynton | May 5, 1863 |
| 232,166 | Bales | Sept. 14, 1880 |
| 290,084 | Maxfield | Dec. 11, 1883 |
| 557,607 | Reynolds | Apr. 7, 1896 |
| 904,767 | Farley | Nov. 24, 1908 |
| 1,487,828 | Ziganek et al. | Mar. 25, 1924 |
| 1,548,390 | Schloe | Aug. 4, 1925 |
| 1,687,645 | Diederich | Oct. 16, 1928 |
| 1,722,590 | Miller | July 30, 1930 |
| 1,755,784 | Jenner | Apr. 22, 1930 |
| 1,801,568 | Petrelli | Apr. 21, 1931 |
| 2,142,134 | Kurth | Jan. 3, 1939 |
| 2,189,502 | Johnston | Feb. 6, 1940 |
| 2,197,614 | Hall | Apr. 16, 1940 |
| 2,199,525 | Kurth | May 7, 1940 |
| 2,369,303 | Kurth et al. | Feb. 13, 1945 |

FOREIGN PATENTS

| Number | Country | Date |
| --- | --- | --- |
| 24,888 | Great Britain | Nov. 1, 1913 |
| 164,930 | Switzerland | June 17, 1932 |
| 371,219 | Great Britain | Apr. 21, 1932 |
| 455,384 | Germany | Feb. 1, 1928 |
| 490,702 | Great Britain | Aug. 19, 1938 |